United States Patent
Benson, Jr. et al.

[11] Patent Number: 5,905,826
[45] Date of Patent: May 18, 1999

[54] CONSPICUITY MARKING SYSTEM INCLUDING LIGHT GUIDE AND RETROREFLECTIVE STRUCTURE

[75] Inventors: Olester Benson, Jr.; David J. Lundin, both of Woodbury, Minn.

[73] Assignee: Minnesota Mining and Manufacturing Co., St. Paul, Minn.

[21] Appl. No.: 08/590,746

[22] Filed: Jan. 24, 1996

[51] Int. Cl.⁶ .................................................. G02B 6/26
[52] U.S. Cl. ............................. 385/31; 385/147; 362/32
[58] Field of Search ........................ 385/147, 31, 900, 385/115, 146; 359/529; 362/32

[56] References Cited

U.S. PATENT DOCUMENTS

| | | | |
|---|---|---|---|
| 4,025,159 | 5/1977 | McGrath | 350/105 |
| 4,059,916 | 11/1977 | Tachihara et al. | 40/130 K |
| 4,171,844 | 10/1979 | Landaal et al. | 296/57 R |
| 4,173,390 | 11/1979 | Kach | 350/96.16 |
| 4,234,907 | 11/1980 | Daniel | 362/32 |
| 4,285,889 | 8/1981 | Parsons | 264/2.6 |
| 4,307,932 | 12/1981 | Winzer | 350/96.15 |
| 4,422,719 | 12/1983 | Orcutt | 350/96.3 |
| 4,447,118 | 5/1984 | Mulkey | 350/96.16 |
| 4,460,940 | 7/1984 | Mori | 362/32 |
| 4,466,697 | 8/1984 | Daniel | 350/96.3 |
| 4,471,412 | 9/1984 | Mori | 362/32 |
| 4,519,017 | 5/1985 | Daniel | 362/32 |
| 4,576,436 | 3/1986 | Daniel | 380/96.1 |
| 4,576,850 | 3/1986 | Martens | 428/156 |
| 4,588,258 | 5/1986 | Hoopman | 350/103 |
| 4,642,736 | 2/1987 | Masuzawa et al. | 362/31 |
| 4,648,690 | 3/1987 | Ohe | 350/321 |
| 4,690,490 | 9/1987 | Mori | 350/96.15 |
| 4,729,068 | 3/1988 | Ohe | 362/31 |
| 4,743,410 | 5/1988 | Grethen et al. | 264/1.4 |
| 4,775,219 | 10/1988 | Appeldorn et al. | 350/103 |
| 4,822,123 | 4/1989 | Mori | 350/96.1 |
| 4,845,596 | 7/1989 | Mouissie | 362/32 |
| 4,865,417 | 9/1989 | Naohiro et al. | 350/96.3 |
| 4,885,663 | 12/1989 | Parker | 362/32 |
| 4,907,132 | 3/1990 | Parker | 362/32 |
| 4,929,169 | 5/1990 | Fujigaki et al. | 425/385 |
| 4,938,563 | 7/1990 | Nelson et al. | 359/529 |
| 5,005,931 | 4/1991 | Mori | 350/96.1 |
| 5,009,020 | 4/1991 | Watanabe | 40/547 |
| 5,027,259 | 6/1991 | Chujko | 362/32 |
| 5,037,172 | 8/1991 | Hekman et al. | 385/31 |
| 5,050,946 | 9/1991 | Hathaway et al. | 385/33 |
| 5,117,304 | 5/1992 | Huang et al. | 359/529 |
| 5,122,939 | 6/1992 | Kazdan et al. | 362/243 |
| 5,187,765 | 2/1993 | Muehlemann et al. | 385/115 |
| 5,226,105 | 7/1993 | Myers | 385/147 |
| 5,298,327 | 3/1994 | Zarian et al. | 428/373 |
| 5,432,876 | 7/1995 | Appeldorn et al. | 385/31 |
| 5,450,235 | 9/1995 | Smith et al. | 359/529 |
| 5,506,929 | 4/1996 | Tai et al. | 385/146 |

FOREIGN PATENT DOCUMENTS

| | | | |
|---|---|---|---|
| 2 626 381 | 1/1991 | France | G02B 6/08 |
| 38 01 385 | of 0000 | Germany. | |
| 44 19 544 A 1 | 12/1995 | Germany. | |
| 53-29740 | 3/1978 | Japan | G02B 5/14 |
| 62-9205 | 1/1987 | Japan | G02B 6/00 |
| 62-9206 | 1/1987 | Japan | G02B 6/00 |
| 63-121002 | 5/1988 | Japan | G02B 6/00 |
| WO 94/20871 | 9/1994 | WIPO. | |

*Primary Examiner*—Akm E. Ullah
*Attorney, Agent, or Firm*—Stephen W. Buckingham

[57] ABSTRACT

A conspicuity marking system includes a light guide which has at least one optically reflective surface for propagating light through the light guide and a retroreflective light extractor for extracting light propagating through the light guide and for retroreflecting light from an external light source incident upon the system. Light propagating through the light guide which is transmitted into the light extractor is reflected back through the light guide such that it exits the light guide at a location displaced from the retroreflective light extractor. Light from an external light source which is incident on the system passes through the light guide and is retroreflected toward the light source by the retroreflective light extractor.

16 Claims, 3 Drawing Sheets

CONSPICUITY MARKING SYSTEM INCLUDING LIGHT GUIDE AND RETROREFLECTIVE STRUCTURE

FIELD OF THE INVENTION

The present invention relates to conspicuity marking systems. More particularly, the present invention relates to a conspicuity marking system that extracts light propagating through a light guide and that retroreflects light from an external light source which is incident on the light guide.

BACKGROUND

Retroreflective conspicuity marking systems are used widely in traffic control systems and personal safety systems to increase the visibility of objects in poor lighting conditions such as, for example, night lighting conditions or conditions of inclement weather. Common examples include retroreflective sheeting for highway signing applications, construction work zone markers such as traffic cones, and retroreflective pavement marking systems.

Such retroreflective conspicuity marking systems may be considered passive systems in that they serve only to retroreflect light incident on the object from an external light source. In some applications it may be desirable to provide an active conspicuity marking system which illuminates an object to increase its conspicuity in typical daylight conditions and which also provides retroreflective conspicuity marking.

Commonly assigned, co-pending patent application U.S. Ser. No. 08/518,337 discloses and claims a light distribution system which comprises a light guide and at least one light extraction overlay optically coupled with the light guide for extracting light from the light guide.

SUMMARY OF THE INVENTION

The present invention provides a conspicuity marking system which comprises a light guide having at least one optically reflective surface for propagating light through the light guide and retroreflective light extraction means optically coupled with a portion of the reflective surface of the light guide. The retroreflective light extraction means functions to (1) reflect a portion of the light propagating through the light guide such that the light is transmitted from a surface of the light guide at a location displaced from the retroreflective light extraction means, and (2) to retroreflect light from an external light source which is incident on the light guide.

In one embodiment the present invention employs a large core optical fiber to transport light. Large core optical fibers are to be distinguished from small diameter optical fibers commonly used in data communication applications and typically measure at least one millimeter in diameter, and preferably measure between about 3 and 20 millimeters in diameter. According to a preferred practice of the present invention, the base surface of a retroreflective sheeting is optically coupled with a portion of the surface of the optical fiber core. Preferably, the refractive index of the retroreflective sheeting is approximately equal to or higher than the refractive index of the optical fiber core material to allow for efficient light transmission between these two media. In use, a portion of the light propagating through the optical fiber is transmitted from the fiber into the retroreflective sheeting, is retroreflected by the sheeting back into the optical fiber and is transmitted from the surface of the fiber at a location displaced from the sheeting. Additionally, light from a remote light source which is incident on the fiber may be transmitted through the optical fiber core, into the retroreflective sheeting and be retroreflected back toward light source. Accordingly, the present invention provides both active and passive conspicuity enhancement.

In a preferred embodiment, the retroreflective sheeting is such that it can be flexed through a relatively small radius of curvature without significantly distorting the optical properties of the cube corner elements.

DETAILED DESCRIPTION OF ILLUSTRATIVE EMBODIMENTS

In describing preferred embodiments of the invention, specific terminology will be used for the sake of clarity. The invention, however, is not intended to be limited to the specific terms so selected, and it is to be understood that each term so selected includes all technical equivalents that operate similarly.

The present invention provides a conspicuity marking system useful on a wide variety of objects and in a wide variety of environments. One aspect of the present invention is the ability to provide both active marking (e.g. illumination) and passive marking (e.g. retroreflection) of an article. An active conspicuity marking system improves the daytime conspicuity of an object. The combination of both active and passive conspicuity marking also provides a redundancy in the conspicuity marking system; if the active system fails due to, for example, a failure of the light source, the passive system remains effective to provide conspicuity marking.

The present invention addresses these and other issues by providing a conspicuity marking system which includes a light guide that has at least one optically reflective surface which allows light to propagate through the light guide. As used herein, the term light guide refers generally to optically transmissive media which are capable of receiving light from a light source and propagating the light through the media. Common examples of light guides include optical fibers and planar waveguides. According to one embodiment of the invention the light guide includes an optical fiber which preferably measures at least about 3 millimeters in diameter. To extract light from the fiber, an optically retroreflective surface is optically coupled to a portion of the optically reflective surface of the optical fiber such that a portion of the light propagating axially through the fiber may become incident on the retroreflective surface and is driven radially from the fiber. Advantageously, light from an external source which is incident on the light guide may be transmitted through the light guide, retroreflected from the retroreflective surface, and redirected toward the light source. Accordingly a system in accordance with the present invention may provide both active and passive conspicuity marking.

Figure 1:
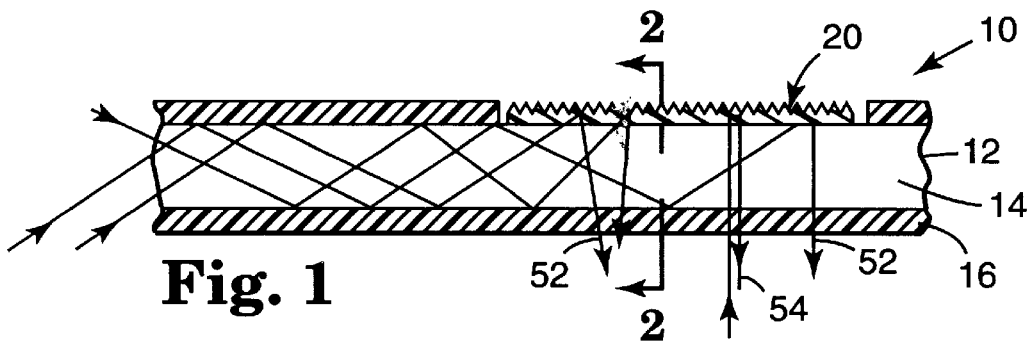
FIG. 1 is a schematic, cross-sectional view of a portion of one embodiment of a conspicuity enhancement system in accordance with the present invention, taken along a longitudinal axis, which illustrates the principles of its operation.
Figure 2:
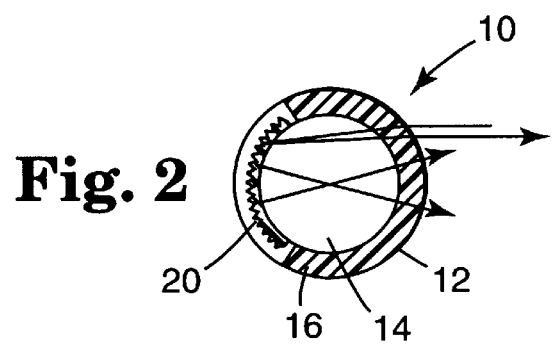
FIG. 2 is a schematic, cross-sectional view of a portion of a conspicuity enhancement system in accordance with FIG. 1, taken in a plane perpendicular to its longitudinal axis, which further illustrates the principles of its operation.

FIGS. 1 and 2 schematically illustrate the basic principles of construction and operation of a conspicuity marking system in accordance with the present invention. Referring to FIGS. 1 and 2 there is shown a conspicuity marking system 10 which includes an optical fiber 12 having a segment of retroreflective sheeting 20 optically coupled along a portion of its length. Optical fiber 12 includes an optical fiber core 14 formed from an optically transmissive material and a cladding layer 16 formed from a material having a lower refractive index than the optical fiber core 14. Cladding layer 16 serves to protect optical fiber core 14. Further, the interface between the optical fiber core 14 and the interior surface of cladding material 16 defines a substantially optically smooth reflective surface which enables light to be transmitted through optical fiber core 14 according to principles of total internal reflection. It will be understood by those of ordinary skill in the optical arts that optical fibers may include additional protective jacketing layers. Additionally, it will be understood by those of ordinary skill in the optical arts that an optical fiber does not require a cladding layer. In such a fiber the ambient medium, typically air, performs the optical function of the cladding layer.

Briefly, a portion of cladding 16 is removed from optical fiber 12 and a strip of retroreflective sheeting 20 is secured to a portion of the surface of optical fiber core 14 such that the base surface of sheeting 20 is optically coupled with optical fiber core 14. Importantly, retroreflective sheeting 20 comprises materials having a refractive index equal to or greater than the refractive index of the optical fiber core material. In use, light rays injected into the fiber from a light source (not shown) propagate along the length of the fiber as discussed above. Some light rays, illustrated by rays 52 traverse the interface between the optical fiber core and are transmitted into retroreflective sheeting 20, where they impinge upon the retroreflective surface of sheeting 20 and are reflected back into optical fiber 12 at an angle which enables rays 52 to be transmitted from the surface of optical fiber 12 at a location displaced from sheeting 20. Additionally, light rays from an external light source which are incident on the system, illustrated by rays 54, are transmitted through optical fiber 12 into retroreflective sheeting 20 and are retroreflected back through the fiber toward the light source. Accordingly, a conspicuity marking system in conformity with the present invention provides both active illumination of an object by directing light rays from optical fiber 12 and passive conspicuity marking of an object by retroreflection of light rays from an external light source.

As used herein, the term optically coupled refers to media which are in intimate optical contact. For the purposes of this disclosure, two media shall be considered optically coupled if a light ray passing through one media may be transmitted directly into the second media. According to the present invention, retroreflective sheeting 20 may be optically coupled to optical fiber core 14 using conventional chemical or mechanical processes. For example, optically clear adhesives including acrylate transfer adhesives are commercially available and are particularly useful for securing retroreflective sheeting 20 to optical fiber core 14. Cladding 16 may be removed by conventional mechanical or chemical processes. Alternatively, optical fiber 12 may be manufactured with portions of cladding 16 missing at predetermined locations along its length.

Without wishing to be bound by a specific theory, applicants believe that light extraction in accordance with the present invention is attributable to the divergence profile assumed by light which is retroreflected by retroreflective sheeting 20. One would expect that light which is transmitted from optical fiber core 14 into retroreflective sheeting 20 would be retroreflected by sheeting 20 and would propagate along its original path, but in the opposite direction, in optical fiber core 14. Light which is incident on a retroreflective sheeting along an axis at a given incidence angle is retroreflected from the sheeting in cone centered approximately about the incidence axis. The cross-sectional shape of the cone (e.g. the divergence profile) is a function of the cube corner sheeting design and the incidence angle. Applicants believe that light rays propagating through optical fiber which are transmitted into retroreflective sheeting are retroreflected into a cone having a divergence profile which is sufficiently broad to cause some portion of the retroreflected light rays to strike the surface of the optical fiber 12 at an angle which is less than the critical angle necessary for total internal reflection. Accordingly, some of these light rays are transmitted from the surface of optical fiber 12.

The present invention contemplates the use of a wide variety of light guides. Functional considerations will typically determine the type of light guide used in a particular conspicuity marking application. Although FIGS. 1–2 illustrate an optical fiber having a substantially circular cross-section, it will be appreciated that optical fibers having different cross sectional shapes (e.g. square, rectangular, polygonal, elliptical) are contemplated by present invention. Additionally, planar waveguides should be considered within the scope of the present invention.

Referring to FIGS. 1–2, optical fiber 12 includes a core 14 which may comprise any suitable optical fiber core material known to the art, including both inorganic glass and synthetic resin fibers, although core materials having a refractive index of from 1.4 to 1.66 are generally preferred. Core 14 is preferably substantially free from impurities which may cause light propagating through optical fiber 12 to disperse. Common optical fiber materials include polymethylmethacrylate and polycarbonate (refractive index 1.58). Cladding layer 16 (where present) may comprise any suitable material known in the art having a refractive index appropriate for the chosen core material. Common optical fiber cladding materials include polyvinylidene fluoride (refractive index 1.42), perfluoroacrylate (refractive index 1.35) and polytetrafuloroethylene (refractive index 1.40), and tetrafluoroethylene-hexafluoropropylene-vinylidene fluoride, the refractive index of which varies with the relative concentration of its constituents, but may generally considered as approximately 1.36.

The dimensions of optical fiber 12 may vary depending upon its intended use. For conspicuity marking purposes in accordance with the present invention, fibers having a diameter ranging from approximately 3 millimeters to 20 millimeters are known to be useful. However it will be appreciated that fibers having lesser or greater diameters are contemplated by the present invention. Additionally, while the fiber depicted in FIGS. 1–2 has a circular lateral cross-section, it will be appreciated that optical fibers having varied cross-sectional shapes (e.g. rectangular, square, elliptical) are equally applicable to the present invention. The desired length of the fiber is determined by the conspicuity marking application. It is known that fiber lengths ranging from 0 to 100 meters are presently commercially useful for illumination purposes. Improved optical efficiency would allow for the use of longer optical fibers.

Figure 4:
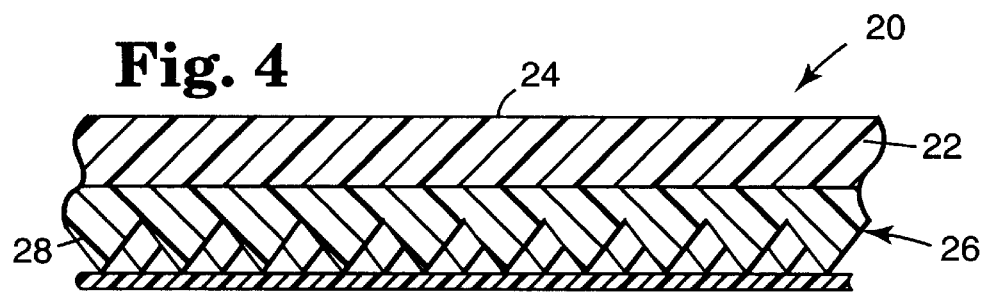
FIG. 4 is a schematic, cross-sectional view of the sheeting illustrated in FIG. 3.
Figure 3:
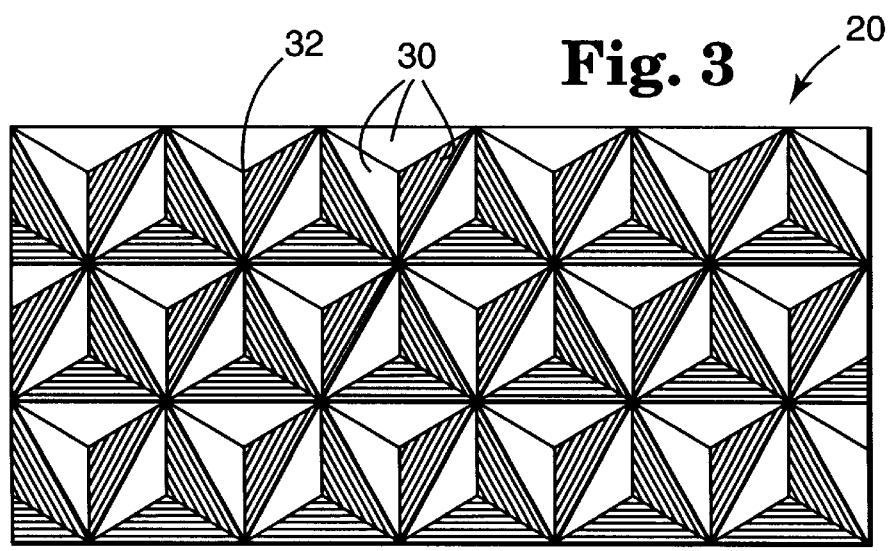
FIG. 3 is a plan view of the structured surface of one embodiment of retroreflective sheeting suitable for use in accordance with the present invention.

A wide variety of retroreflective sheeting designs are useful in conspicuity marking systems according to the present invention. The present invention contemplates the use of either beaded retroreflective sheetings or cube-corner type retroreflective sheetings. FIG. 3 is a schematic, cross-sectional view of one embodiment of cube-corner retroreflective sheeting 20 useful in conspicuity marking applications in accordance with the present invention. FIG. 4 is a plan view of the structured surface of the sheeting 20 depicted in FIG. 3. Referring to FIGS. 3 and 4, sheeting 20 comprises a substantially optically transparent substrate 22 having a base surface 24 and a structured surface 26 opposite base surface 24. Structured surface 26 comprises an array of cube corner elements 28. Each cube corner element 28 is in the shape of a trihedral prism having three substantially mutually perpendicular faces 30 which intersect at a point to define the apex 32 of the cube corner element 28. The cube corner elements 28 may be canted to improve the retroreflective performance of the sheeting as disclosed in U.S. Pat. No. 4,588,258, incorporated herein by reference. Additionally, the cube corner elements may be formed such that the faces 30 intersect at angles which deviate slightly from orthogonal angles, as disclosed in U.S. Pat. No. 4,775,219, incorporated herein by reference.

Retroreflective sheeting 20 may be of a single layer construction, wherein substrate 22 and cube corner elements 28 are composed of the same materials. Alternatively, retroreflective sheeting 20 may be of a multi-layer construction, wherein substrate 22 and cube corner elements 28 are composed of materials having different properties. According to one embodiment of the present invention, retroreflective sheeting 20 is manufactured in accordance with U.S. Pat. No. 5,450,235, incorporated herein by reference. In another embodiment, retroreflective sheeting 20 is manufactured in accordance with principles of the invention disclosed in U.S. Ser. No. 08/472,444, incorporated herein by reference. In brief summary, these disclosures are directed toward flexible, multi-layer retroreflective sheeting constructions wherein the substrate is formed from a relatively flexible material and the cube corner elements are formed from a relatively rigid material. These constructions provide a retroreflective sheeting which can be flexed or curved through a relatively small radius of curvature without causing significant distortion of the optical properties of the sheeting.

According to an embodiment disclosed in U.S. Pat. No. 5,450,235, a retroreflective sheeting for use in accordance with the present invention comprises a body layer which contains a light transmissible polymeric material having an elastic modulus less than $7 \times 10^8$ pascals and a plurality of cube corner elements comprising a light transmissible polymeric material having an elastic modulus greater than $18 \times 10^8$ pascals. According to the embodiment disclosed in U.S. Ser. No. 08/472,444, retroreflective sheeting for use in accordance with the present invention comprises an overlay film comprising a flexible material and an array of cube corner elements formed from a relatively rigid material bonded to the overlay film. Preferably, the material composing the overlay film has an elastic modulus of less than about $13 \times 10^8$ pascals and the cube corner elements have and elastic modulus greater than about $25 \times 10^8$ pascals.

Illustrative examples of thermoplastic polymers that may be used in the cube-corner elements include acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), poly(vinylidene fluororide); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a poly(ester) and poly(carbonate) blend, and a fluoropolymer and acrylic polymer blend.

Additional materials suitable for forming the cube-corner elements are reactive resin systems capable of being crosslinked by a free radical polymerization mechanism by exposure to actinic radiation. for example, electron beam, ultraviolet light, or visible light. Additionally, these materials may be polymerized by thermal means with the addition of a thermal initiator such as benzoyl peroxide. Radiation-initiated cationically polymerizable resins also may be used.

Reactive resins suitable for forming the cube-corner elements may be blends of photoinitiator and at least one compound bearing an acrylate group. Preferably the resin blend contains a difunctional or polyfunctional compound to ensure formation of a crosslinked polymeric network upon irradiation.

Illustrative examples of resins that are capable of being polymerized by a free radical mechanism include acrylic-based resins derived from epoxies, polyesters, polyethers and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof The term acrylate is used here to encompass both acrylates and methacrylates. U.S. Pat. No. 4,576,850 to Martens (disclosure incorporated herein in its entirety by reference) discloses examples of crosslinked resins that may be used in the cube-corner elements of the present invention.

Ethylenically unsaturated resins include both monomeric and polymeric compounds that contain atoms of carbon, hydrogen and oxygen, and optionally nitrogen, sulfur and the halogens. Oxygen or nitrogen atoms or both are generally present in ether, ester, urethane, amide and urea groups. Ethylenically unsaturated compounds preferably have a molecular weight of less than about 4,000 and preferably are esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Some examples of compounds having an acrylic or methacrylic group are listed below. The listed compounds are illustrative and not limiting.

(1) Monofunctional compounds:
ethylacrylate, n-butylacrylate, isobutylacrylate, 2-ethylhexylacrylate, n-hexylacrylate, n-octylacrylate, isobornyl acrylate, tetrahydrofurfuryl acrylate, 2-phenoxyethyl acrylate, and N,N-dimethylacrylamide;

(2) Difunctional compounds:
1,4-butanediol diacrylate, 1,6-hexanediol diacrylate, neopentylglycol diacrylate, ethylene glycol diacrylate, triethyleneglycol diacrylate, and tetraethylene glycol diacrylate;

(3) Polyfunctional compounds:
trimethylolpropane triacrylate, glyceroltriacrylate, pentaerythritol triacrylate, pentaerythritol tetraacrylate, and tris (2-acryloyloxyethyl)isocyanurate.

Some representative examples of other ethylenically unsaturated compounds and resins include styrene, divinylbenzene, vinyl toluene, N-vinyl pyrrolidone, N-vinyl caprolactam, monoallyl, polyallyl, and polymethallyl esters such as diallyl phthalate and diallyl adipate, and amides of carboxylic acids such as and N,N-diallyladipamide.

Illustrative examples of photopolymerization initiators which can be blended with the acrylic compounds include the following: benzil, methyl o-benzoate, benzoin, benzoin ethyl ether, benzoin isopropyl ether, benzoin isobutyl ether, etc., benzophenone/tertiary amine, acetophenones such as 2,2-diethoxyacetophenone, benzil methyl ketal, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyldiphenylphosphine oxide, 2-methyl-1-4-(methylthio)phenyl-2-morpholino-1-propanone, et cetera. These compounds may be used individually or in combination.

Cationically polymerizable materials include but are not limited to materials containing epoxy and vinyl ethers functional groups. These systems are photoinitiated by onium salt initiators such as triarylsulfonium, and diaryliodonium salts.

Preferred polymers for the cube-corner elements include poly(carbonate), poly(methylmethacrylate), poly (ethyleneterephthalate), and crosslinked acrylates such as multi-functional acrylates or epoxies and acrylated urethanes blended with mono- and multi-functional monomers. These polymers are preferred for one or more of the following reasons: thermal stability, environmental stability, clarity, excellent release from the tooling or mold, and capable of receiving a reflective coating.

Illustrative examples of polymers that may be employed in the body layer include:

fluorinated polymers such as: poly (chlorotrifluoroethylene), for example Kel-F800™ available from 3M St. Paul, Minn.; poly (tetrafluoroethylene-co-hexafluoropropylene), for example Exac FEP™ available from Norton Performance, Brampton, Mass.; poly (tetrafluoroethylene-co-perfluoro(alkyl)vinylether), for example, Exac PEA™ also available from Norton Performance; and poly(vinylidene fluoride-co-hexafluoropropylene), for example, Kynar Flex-2800™ available from Pennwalt Corporation, Philadelphia, Pa.;

ionomeric ethylene copolymers such as: poly(ethylene-co-methacrylic acid) with sodium or zinc ions such as Surlyn-8920™ and Surlyn-9910™ available from E. I. duPont Nemours, Wilmington, Del.;

low density polyethylenes such as: low density polyethylene; linear low density polyethylene; and very low density polyethylene;

plasticized vinyl halide polymers such as plasticized poly(vinylchloride);

polyethylene copolymers including: acid functional polymers such as poly(ethylene-co-acrylic acid) and poly (ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)_n$— where n is 0–12, and poly(ethylene-co-vinylacetate); and aliphatic and aromatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, (2) polydiols such as polypentyleneadipate glycol, polytetramethylene ether glycol, polyethylene glycol, polycaprolactone diol, poly-1,2-butylene oxide glycol, and combinations of these polydiols, and (3) chain extenders such as butanediol or hexanediol. Commercially available urethane polymers include: PN-03, or 3429 from Morton International Inc., Seabrook, N.H.

Combinations of the above polymers also may be employed in the body layer of the body portion. Preferred polymers for the body layer include: the ethylene copolymers that contain units that contain carboxyl groups or esters of carboxylic acids such as poly(ethylene-co-acrylic acid), poly(ethylene-co-methacrylic acid), poly(ethylene-co-vinylacetate); the ionomeric ethylene copolymers; plasticized poly(vinylchloride); and the aliphatic urethanes. These polymers are preferred for one or more of the following reasons: suitable mechanical properties, good adhesion to the land layer, clarity, and environmental stability.

A seal film can be applied to the backside of the cube-corner elements; see, for example, U.S. Pat. Nos. 4,025,159 and 5,117,304. The sealing film maintains an air interface at the backside of the cubes to provide retroreflectivity according to the principles of total internal reflection. Alternatively, a specular reflective coating such as a metallic coating (not shown) can be placed on the backside of the cube-corner elements 28 to promote retroreflection by specular reflection. Metallic coatings also prevent light leakage from the retroreflective sheeting. The metallic coating can be applied by known techniques such as vapor depositing or chemically depositing a metal such as aluminum, silver, or nickel. A primer layer may be applied to the backside of the cube-corner elements to promote the adherence of the metallic coating. A backing and/or an adhesive layer also can be disposed behind the cube-corner elements to enable the cube-corner retroreflective sheeting 20 to be secured to a substrate.

Another aspect of the present invention relates to the ability to design a conspicuity marking system for particular viewing and lighting geometries. The optical profile of light retroreflected from retroreflective sheeting is a function of the geometry of the retroreflective elements on the sheeting. A wide variety of cube corner sheeting optics are presently commercially available. By selecting a retroreflective sheeting having the appropriate retroreflective element geometry, the system may be tailored to exhibit its optimal performance at predetermined illumination and viewing angles.

Figure 5:
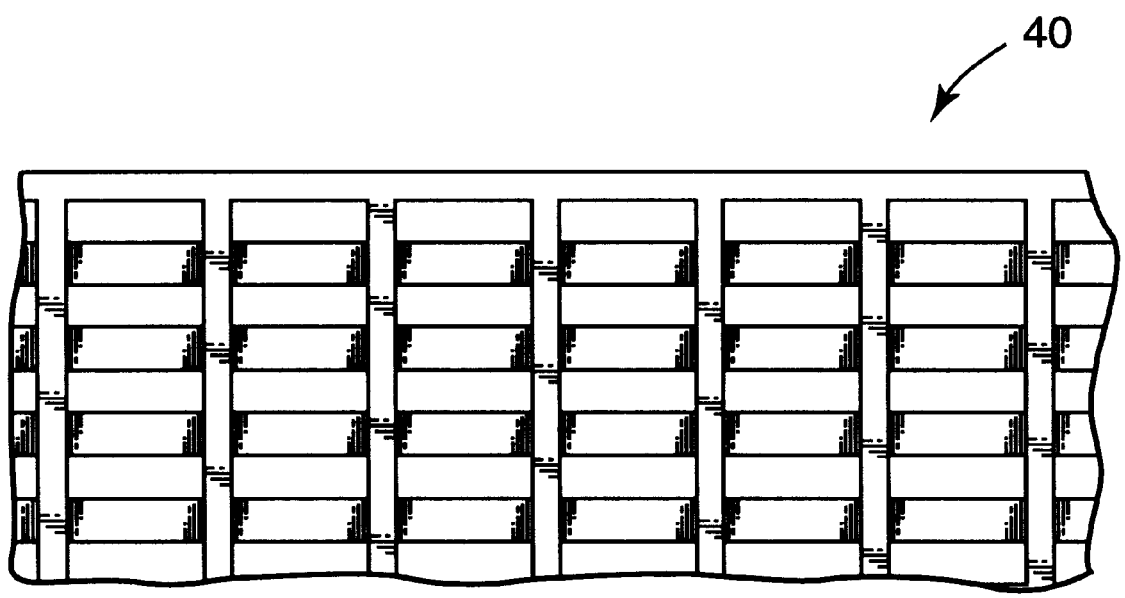
FIG. 5 is a plan view of a the structured surface of a second embodiment of retroreflective sheeting suitable for use in accordance with the present invention.

For example, FIG. 5 is a plan view of the structured surface of a second embodiment of a cube corner retroreflective sheeting 40 which may be used in conspicuity marking systems according to the present invention. Retroreflective sheeting 40 is designed to retroreflect light incident on sheeting 40 at high entrance angles relative to an axis extending normally from the plane of the sheeting. See U.S. Pat. No. 4,938,563, incorporated herein by reference. A conspicuity marking system which incorporates retroreflective sheeting in accordance with FIG. 5 is particularly well adapted for use in conspicuity marking applications which are characterized by high incidence angle lighting conditions. Examples include: jersey barrier marking applications, pavement marking applications. An important advantage of the present invention is the ability to select a retroreflective sheeting design according to the particular requirements of an application.

In yet another embodiment of a conspicuity marking system according to the present invention a retroreflective surface may be formed into a portion of the reflective surface of the light guide. For example, in the system depicted in FIGS. 1–2, a retroreflective surface may be formed into a portion of optical fiber core 14.

Figure 6:
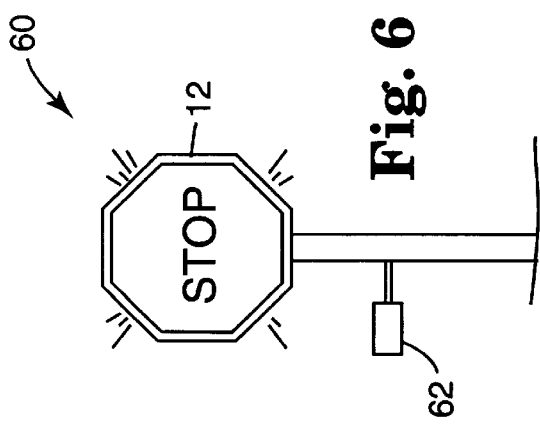
FIG. 6 is a front plan view of a highway traffic sign incorporating a conspicuity enhancement system in accordance with the present invention.

FIG. 6 is a schematic plan view of a highway traffic sign 60 which incorporates a conspicuity marking system 10 in accordance with aspects of the present invention. Referring to FIG. 6 a conspicuity marking system 10 in accordance with the present invention may extend substantially entirely around the perimeter of the sign 60. Light source 62 injects light into optical fiber 12 to provide active illumination of the stop sign. Advantageously, conspicuity marking system 10 will retroreflect light incident on sign 60 from an external light source such as, for example, automobile headlights. Light source 62 is preferably capable of injecting light into optical fiber 12 in a cone which is less than the acceptance angle of the optical fiber. The acceptance angle of a light guide is a function of the difference in refractive indices of the optical fiber core 14 and the cladding 16, if any. Commercially available light sources suitable for injecting light into large diameter optical fibers include quartz-halogen lamps, metal halide lamps, and xenon-metal halide lamps.

Another aspect of the present invention is the ability to provide conspicuity marking along a length or following a contour of an article. For example, a conspicuity marking system in accordance with the present invention may be positioned along the entire length of a vehicle such as, for example, an automobile, a school bus or a semi-truck trailer, boats, boat trailers, etc. Alternatively, a conspicuity marking system may extend around the full contour of the side or rear wall of a vehicle or around the perimeter of a road sign or traffic cone. Additionally, retro-fitting a vehicle with a conspicuity system in accordance with the present invention requires relatively minimal expense and relatively little physical alteration of the vehicle.

Figure 7:
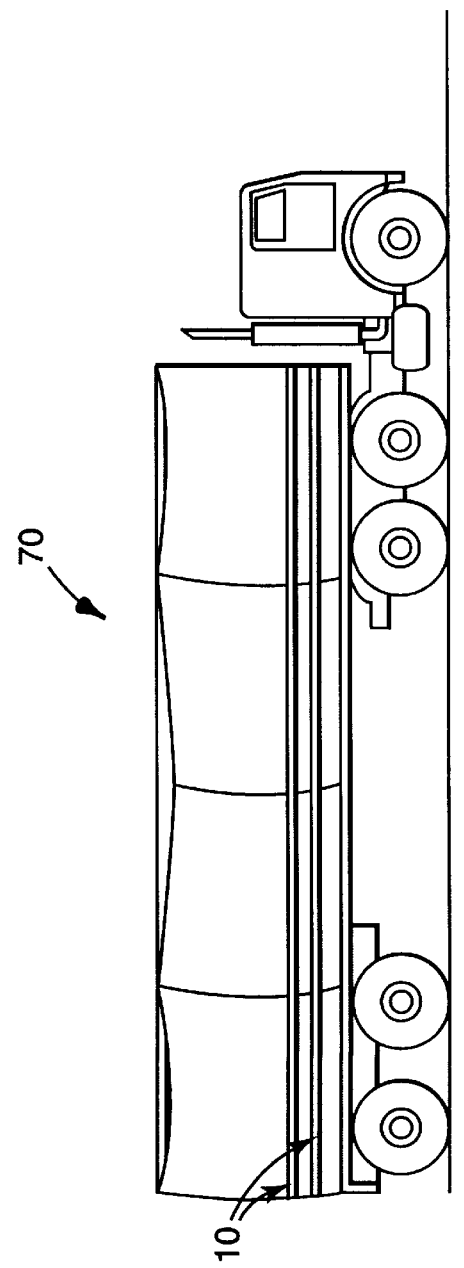
FIG. 7 is a perspective view of a highway vehicle incorporating a conspicuity enhancement system in accordance with the present invention.

FIG. 7 is a perspective view of a highway vehicle 70 which incorporates a conspicuity marking system 10 in accordance with aspects of the present invention. Because both the optical fiber and the retroreflective sheeting are relatively flexible, the fiber may extend around the full contour of the surface of the vehicle. Optical fiber 12 may be formed from a substantially transparent material or, if desired, may include colorants, pigments, or dyes to change the color of the system. Additionally, optical fiber 12 may be supplied with white light or with colored light to change the color of the system.

Figure 8:
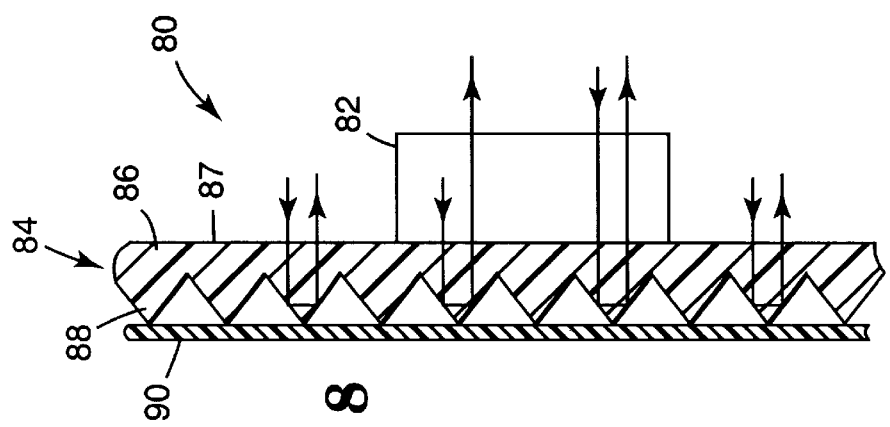
FIG. 8 is a schematic, cross-sectional view of a portion of a second embodiment of a conspicuity enhancement system in accordance with the present invention, taken perpendicular to a longitudinal axis, which illustrates the principles of its operation.

As discussed briefly above, another aspect of the present invention is the ability to incorporate a wide variety of configurations of light guides. FIG. 8 depicts an embodiment of a conspicuity marking system 80 in accordance with the present invention in which one surface of a substantially rectangular light guide 82 is optically coupled with retroreflective sheeting 84. Optical fiber 82 is shown without a cladding layer surrounding fiber 82, however it will be appreciated that optical fiber 82 could include a cladding layer in accordance with the discussion pertaining to FIGS. 1–2 above. Retroreflective sheeting 84 comprises a single layer substrate 86 which comprises a base surface 87 and structured surface including an array of cube corner elements 88 opposite base surface 88. Additionally, a seal film 90 is connected to the structured surface to provide an air interface such that cube corner elements reflect light according to the principles of total internal reflection. Conspicuity marking system 80 functions according to the same principles discussed in conjunction with FIGS. 1–2.

The above discussion discloses a conspicuity marking system which comprises at least one optically reflective surface and retroreflective light extraction means optically coupled with a portion of the surface. Although multiple embodiments of the present invention has been illustrated and described, it will be appreciated by those of ordinary skill in the art that insubstantial changes calculated to achieve the same result may be substituted for the specific embodiments and steps disclosed above. This application is intended to cover any such adaptations or variations of the present invention. Therefore, it is intended that this invention be limited only by the appended claims and equivalents thereof.

EXAMPLES

Cube Corner Retroreflective Sheeting

A conspicuity marking system in accordance with the present invention was constructed at the 3M Center in St. Paul, Minn., U.S.A. A 6 mil polyurethane film (commerically available as 3M Scotch™ brand polyurethane protective tape) was laminated to a polyester siliconized release liner. This film was used as an overlay film to which an array of cube corner elements could be cured. A resin blend of 25 percent by weight trishydroxyethyl isocyanurate triacrylate, 50 percent by weight trimethylolpropane triacrylate, and 25 percent by weight tetrahydrofurfuryl acrylate containing $6.62 \times 10^{-2}$ mol/kg of photoinitiator CGI-1700, commercially available from Ciba-Geigy Corporation, was coated into the cavities of a cube corner mold having a cube corner geometry as disclosed in U.S. Pat. No. 4,588,258. The polyurethane surface of the adhesive laminate was then laminated onto the resin, using an ink roller to minimize the resin thickness. The sheeting was cured using high intensity UV-visible light from a Fusion-EPIQ 6000 "V" lamp (operating at 600 W/in). The replicated laminate was stepped from the tool and annealed in an oven at 200 degrees Fahrenheit for five minutes.

A one inch section of cladding was removed from a 13.5" (343 millimeter) length of ⅜" (9.5 millimeter) diameter optical fiber, exposing the optical fiber core. The fiber used is commercially available as Lumenyte Optical Fiber EL-400 from Lumenyte International Corporation in Costa Mesa, Calif., U.S.A. A ¼"×2" (6.35 millimeter×50.8 millimeter) piece of the retroreflective sheeting discussed above was adhered to the surface of the optical fiber core such that the base surface of the sheeting was optically coupled with the surface of the optical fiber core.

Light was injected into one end of the optical fiber using a tungsten-halogen light source equipped with a fiber optic light guide. The opposing end of the fiber was covered with a reflective coating. The optical fiber emitted light from its surface in a region approximately opposite the location of the retroreflective sheeting. To test the retroreflective capabilities of the sheeting a light source was directed through the optical fiber toward the retroreflective sheeting. The incident light was effectively retroreflected toward the light source.

Beaded Retroreflective Sheeting

A conspicuity marking system in accordance with the present invention was constructed at the 3M Center in St. Paul, Minn., U.S.A. A one inch section of cladding was removed from a 13.5" (343 millimeter) length of ⅜" (9.5 millimeter) diameter optical fiber, exposing the optical fiber core. The fiber used is commercially available as Lumenyte Optical Fiber EL-400 from Lumenyte Corporation in Costa Mesa, Calif., U.S.A. A 6"×6" (152.4×152.4 mm) sheet of 3M VHB Adhesive (F9460PC) was laminated onto the front surface of a 7"×7" (177.8 mm×177.8 mm) sheet of 3M Reflecto-Lite retroreflective sheeting. A ¼"×1" piece was cut from the the retroreflective sheeting laminate and adhered to the surface of the optical fiber core.

Light was injected into one end of the optical fiber using tungsten-halogen light source equipped with a fiber optic light guide. The opposing end of the fiber was covered with a reflective coating. The retroreflective laminate extracted light from the fiber in a region approximately opposite the fiber from the sheeting. The light source was removed from the fiber and a separate light source was directed at the through the fiber from a position approximately opposite the retroreflective laminate. The retroreflective laminate effectively retroreflected the light toward the light source.

What is claimed is:

1. A conspicuity marking system, comprising:

a light guide having at least one optically reflective surface for propagating light through the light guide; and retroreflective light extraction means optically coupled with a portion of the optically reflective surface of the light guide for (1) reflecting a portion of the light propagating axially through the light guide such that the light is transmitted from a surface of the light guide at a location displaced from the retroreflective light extraction means, and (2) retroreflecting light from an external light source which is incident on the light guide.

2. A conspicuity marking system according to claim 1, wherein:

the light guide comprises an optical fiber having a length extending along a longitudinal axis of the fiber.

3. A conspicuity marking system according to claim 1, wherein the optical fiber includes:

an optical fiber core measuring between at least about 3.0 millimeters in diameter and comprising a substantially optically transparent material; and a cladding layer surrounding the optical fiber core, the cladding formed from a material having a refractive index less than the refractive index of the optical core such that light injected into one end of the optical fiber propagates through the fiber according to the principles of total internal reflection.

4. A conspicuity marking system according to claim 3, wherein:

the optical fiber core comprises a material having a refractive index of between 1.46 and 1.6; and the cladding layer is formed from a material having a refractive index of between 1.35 and 1.42.

5. A conspicuity marking system according to claim 3, wherein:

the optical fiber core contains a polymer selected from the group consisting of polymethylmethacrylate and polycarbonate.

6. A conspicuity marking system according to claim 2, wherein:

the optical fiber has a cross-sectional shape selected from the group consisting of circular, elliptical, and polygonal.

7. A conspicuity marking system according to claim 2, wherein:

the light guide comprises a planar wave guide.

8. A conspicuity marking system according to claim 1, wherein:

the retroreflective light extraction means comprise a microstructured retroreflective surface formed in the optically reflective surface.

9. A conspicuity marking system according to claim 1, wherein:

the retroreflective light extraction means comprise a thin, flexible strip of beaded retroreflective sheeting.

10. A conspicuity marking system according to claim 1, wherein:

the retroreflective light extraction means comprise a thin, flexible strip of cube-corner retroreflective sheeting.

11. A conspicuity marking system according to claim 10, wherein the cube-corner retroreflective sheeting comprises:

a body layer comprising a first material having an elastic modulus less than $7 \times 10^8$ pascals; and a plurality of cube corner elements comprising a second material having an elastic modulus greater than about $18 \times 10^8$ pascals.

12. A conspicuity marking system according to claim 10, wherein the cube-corner retroreflective sheeting comprises:

a body layer comprising a first material having an elastic modulus less than $13 \times 10^8$ pascals; and a plurality of cube corner elements comprising a second material having an elastic modulus greater than about $25 \times 10^8$ pascals.

13. A conspicuity marking system, comprising:

a light guide having at least one optically reflective surface for propagating light along the light guide; and retroreflective sheeting optically coupled with a portion of the optically reflective surface of the light guide.

14. A conspicuity marking system according to claim 13, wherein the retroreflective sheeting comprises a retroreflective structured surface.

15. A conspicuity marking system according to claim 13, wherein the retroreflective sheeting comprises a plurality of retroreflective beads.

16. A conspicuity marking system, comprising:

a light guide having at least one optically reflective surface for propagating light along the light guide, wherein at least portion of the optically reflective surface includes an array of retroreflective cube corner elements formed therein.

* * * * *